United States Patent [19]
Schubert et al.

[11] Patent Number: 4,878,970
[45] Date of Patent: Nov. 7, 1989

[54] HEATING OF A FOAM CUP TO INCREASE STIFFNESS

[75] Inventors: John C. Schubert; Edward C. Leduc, both of Marietta, Ga.

[73] Assignee: Amoco Corporation, Chicago, Ill.

[21] Appl. No.: 199,666

[22] Filed: May 27, 1988

[51] Int. Cl.$^4$ ............................................. B32B 31/26
[52] U.S. Cl. ........................................ 156/69; 156/83; 220/902; 229/1.5 B; 264/321; 428/913
[58] Field of Search ............................. 156/69, 78, 83; 220/902; 229/1.5 B; 264/321; 428/913

[56] References Cited

U.S. PATENT DOCUMENTS

| | | | |
|---|---|---|---|
| 3,344,222 | 9/1967 | Shapiro et al. | 264/321 |
| 3,616,020 | 10/1971 | Whelan et al. | 156/244.27 X |
| 3,669,794 | 6/1972 | Mazur | 156/309.9 X |
| 3,967,991 | 7/1976 | Shimano et al. | 156/218 X |
| 4,359,160 | 11/1982 | Myers et al. | 264/321 X |
| 4,547,412 | 10/1985 | Schneider et al. | 264/321 X |
| 4,579,275 | 4/1986 | Peelman et al. | 264/321 X |

*Primary Examiner*—Robert A. Dawson
*Attorney, Agent, or Firm*—Maria Parrish Tungol; Ralph C. Medhurst; William M. Magidson

[57] ABSTRACT

The method of improving the stiffness of a polystyrene foam cup having a generally closed cell foam sidewall and bottom and a solid plastic film coating on at least the outer surface thereof comprising placing said cup around a heated mandrel, said mandrel having an outside diameter sufficiently less than an inside diameter of said cup to allow the cup sidewall to expand, at a temperature and for a time sufficient to expand the sidewall.

13 Claims, 1 Drawing Sheet

HEATING OF A FOAM CUP TO INCREASE STIFFNESS

BACKGROUND OF THE INVENTION

This invention relates to a method of heat treating a foam cup, made from a foam resin sheet produced by the blown bubble technique to which a solid resin layer is applied to one or both sides of the foam sheet, to improve the sidewall stiffness.

Foam cups are widely used for individual servings of hot beverages, such as coffee and soup, and cold beverages such as soft drinks, with millions used every day. The cup must have sufficient strength to permit handling by the user, and at the same time, be made from a minimum amount of resin. Polystyrene and other resins can be used to produce the cup although the majority are now made from polystyrene.

U.S. Pat. No. 4,579,275 describes a method of treating a cup having a closed cell foam wall and a solid plastic film coating on at least the outer surface thereof by contacting the inner wall of the cup but not the bottom with a heated mandrel at a time and temperature sufficient to expand the wall.

U.S. Pat. No. 4,547,412 describes a method of improving stiffness of a polystyrene foam container having a sidewall and a bottom by heating the container in an unrestrained state sufficiently to increase the thickness of the sidewall at least 10%.

U.S. Pat. No. 3,344,222 describes treating foam cups produced by extrusion of foamable sheets of polystyrene with no solid layer present by heating the foam cup while holding the cup between restraining surfaces. This treatment is said to provide a density gradient with denser foam near the surface of the cup, thus increasing the strength of the cup. According to the patentees, the thickness of the wall or walls of the container does not apparently change. The patentee also states that "a wall gradient of two or three times the original thickness will severely impair the formation of the dense surface walls and the heat-insulating interior zones".

U.S. Pat. No. 4,359,160 describes a process wherein a sheet of polystyrene foam is produced by the extrusion of molten polystyrene containing a blowing agent and a nucleating agent from a slit-ring orifice. The polystyrene foam cup is thermoformed by a plug-system method which stretches the closed, generally spherical closed cells formed in the extruded sheet, and produces a product containing "pancake" shaped cells. Upon heating this thermoformed cup, as when hot beverage is added thereto, the cells tend to return to spherical shape.

Applicants have found, contrary to indications in the prior art, that stiffness as measured by the sidewall deflection of a polystyrene foam cup having a sidewall and bottom prepared from a laminate of polystyrene foam having generally closed cells and, on at least the outer surface thereof, a layer of solid polystyrene, is improved by placing the polystyrene foam cup around a heated mandrel, the heated mandrel having an outside diameter sufficiently less than the inside diameter of the foam cup so that sufficient space is present between the cup sidewall and the mandrel to allow the cup sidewall to expand toward the mandrel.

From the foregoing, it can be seen that the object of this invention is a method to provide a polystyrene foam cup with improved sidewall deflection strength. Other objects of this invention will become apparent to those skilled in the art upon reading this disclosure.

SUMMARY OF THE INVENTION

The method of improving the stiffness of a polystyrene foam cup having a generally closed cell foam sidewall and bottom, comprising placing said cup around a heated mandrel, said mandrel having an outside diameter sufficiently less than an inside diameter of said cup so that the mandrel does not contact the cup sidewall and thereby allowing the cup sidewall to expand, at a temperature and for a time sufficient to expand the sidewall.

DESCRIPTION OF THE INVENTION

Figure 2:
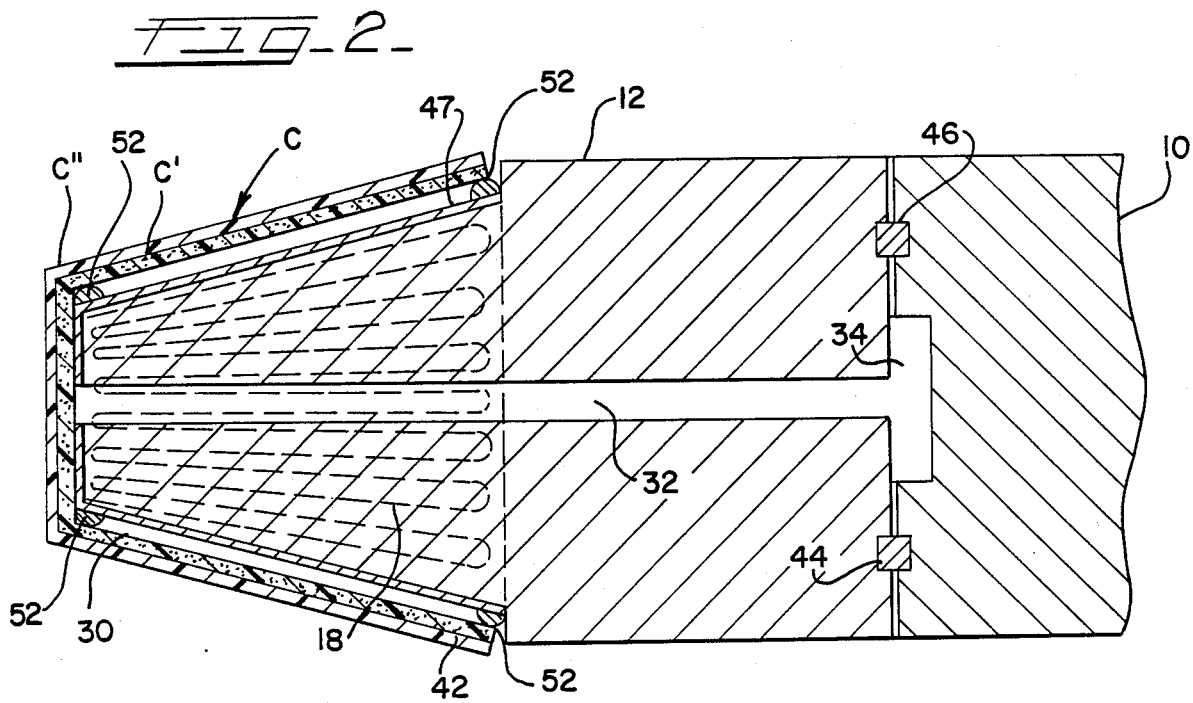
FIG. 2 is a cross-section of the turret and mandrel on line 2—2 of FIG. 1.

Broadly, our invention resides in a method of providing a polystyrene foam cup having a sidewall and a bottom, said cup having an improved sidewall deflection strength and being suitable for use with hot beverages, such as that designated C in FIG. 2, having a closed cell foam wall, such as C' in FIG. 2, and a solid plastic film coating, such as C" in FIG. 2, comprising:

(a) forming the foam cup from a roll stock of a polystyrene foam by rolling said roll stock into shape to form the sidewall, subsequently forming the bottom of the cup from said roll stock and sealing the bottom to the sidewall of the foam cup, (b) placing the cup around a heated mandrel, said mandrel having an outside diameter sufficiently less than than the inside diameter of the cup so that the sidewall of the cup is not in contact with the mandrel, and (c) maintaining the cup around said mandrel at a temperature and for a time sufficient to expand the sidewall of the cup to increase the sidewall deflection strength of the cup.

The roll stock is typically produced from a laminate of a polystyrene foam formed from a polystyrene resin and a volatile blowing agent and, on at least one surface of the foam, a layer of a solid polystyrene.

The roll stock can be produced by the foam sheet production line in Mazur U. S. Pat. No. 3,699,794 or the double coated line per Whelan et al. U.S. Pat. No. 3,616,020, both patents incorporated herein by reference. The double coated line has capability for direct extrusion coating of the foam sheet on either surface with any desired thickness of an impact modified polystyrene, however the line must include the means to regulate cooling of the outer surface of the foam sheet at the point of foam extrusion by air having a controlled temperature and flow rate. The practice of this invention requires that the blowing agent system be capable of adding simultaneously a combination of at least two separate blowing agents in any desired ratio, the rate of each being independent of the other, and the total rate in combination selectable by the operator. The winding of the composite sheet must be done in the web width desired for use on the cup machine to properly control diffusion of air into the sheet and blowing agent equalization from the roll stock.

Among the blowing agents that can be used to obtain the desired results of the instant invention are hydrocarbons such as ethane, propane, n-butane, n-pentane, isopentane, and hexane, chlorofluorocarbons such as F11, F12, F22, and F114, chlorofluorocarbons which include at least one hydrogen atom within the molecule, $CO_2$, water, $N_2$, ethylchloride, methyl chloride, methylene chloride, and others common to the industry. Mixtures of blowing agents listed above can also be used. Of particular interest are mixtures of n-butane and isopentane and mixtures of n-butane and n-pentane in the weight ratio of 5/95 to 95/5. These mixtures of blowing agents have been shown to be desirable for producing acceptable foam cell gap pressure during the formation of the foam roll stock which in turn provides the desired density control. Use of said mixtures also improves the compressive strength and sheet formability (ability to withstand stress during thermoforming) of the resulting foam roll stock.

The mixtures of blowing agents listed above, particularly mixtures of n-butane and isopentane and mixtures of n-butane and n-pentane in the weight ratio of 5/95 to 95/5, have produced unexpectedly superior results in other cup forming processes such as the process described in U.S. Pat. No. 4,579,275, herein incorporated by reference wherein the bottom of the cup is not contacted by the heated mandrel. It has been found that use of the aforementioned mixtures provides the advantages described above when used in the process of U.S. Pat. No. 4,579,275.

If the foam weight of the roll stock as measured in units of grams/100 in.$^2$, were increased to raise the sidewall deflection strength, the roll stock material becomes too thick to feed easily into a commercially available cup producing machine. Materials which were produced with n-butane as a blowing agent, had a high vapor pressure at the extrusion conditions making it extremely difficult to extrude foam with a density greater than 5 pounds per cubic foot. A number of trials were run with n-pentane as a blowing agent in an effort to attain a desired "as extruded" foam density, however, the laminate construction of foam and a solid resin layer on at least one surface of the polystyrene foam decreased in thickness when cooled to room temperature. When the roll stock was formed into cups on the cup making machine, low thickness of the roll stock at the desired foam weights resulted in a cup with lower than desired sidewall deflection strength.

By using a single blowing agent or a blowing agent of a fixed percentage mixture, the vapor pressure of the blowing agent is constant and the sheet viscosity produced by the extrusion process can only be controlled by the temperature of the extruder and/or the total amount of blowing agent added. If the desired combination of sheet thickness and foam weight required is not achieved until the level of blowing agent is reduced to a level too low for adequate plasticization, then the melt viscosity of the material in the extruder increases beyond practical limits and the temperature of the extruder results in melt fracture of the foam sheet. If the blowing agent level is maintained at a higher level and the melt temperature of the extruded material is reduced to obtain the desired sheet density, the resulting foam cell structure becomes large, and a rough appearance with poor printability on the cup surface results along with increased sheet brittleness. The use of a combination of blowing agents such as n-butane and n-pentane or n-butane and isopentane is desirable to provide the desired sheet thickness, appearance, and forming characteristics for lip rolling such that the sheet thickness supplied to the cup producing machine can be rolled into a rim or lip having a diameter of 0.100–0.180 inches and the sidewall thickness after heating to re-inflated configuration is at a desirable thickness of 0.042 in. The use of a combination of blowing agents such as n-butane and isopentane or n-butane and n-pentane has been found to provide a greater degree of control of the foam skin in density and appearance, especially after printing. This greater control of the foam skin improves appearance and strength as well as imparting a pleasant feel to the lip and the desired sidewall deflection strength of 300 grams or greater can be achieved.

The foam density can be varied from about 2 to about 10 pounds per cubic foot, with foam cell size from about 1.5 mil to about 5 mil. The foam cells are typically obround with the longest axis in the machine or extrusion direction. The cell size control is typically augmented by the addition of talc in the range of about 0.05 to about 3 percent to the crystal polystyrene feedstock. The base polystyrene resin can have a melt flow rate of about 0.8 to about 7.5, and can include styrene butadiene or other impact modifier to improve sheet flexibility.

Reclaim of the laminate material can be used in the foam layer and in the coating layer. Up to 60 weight percent of the foam layer can be reclaim and up to 30 weight percent of the coating layer can be reclaim.

If a colorant is desired in either the foam or coating layers, the colorant can be added in the resin blending stations. Typically, cups have been produced from white foam material and a coating of yellow or almond color. Up to a four color print can be added to the coating layer via off-line printing.

Briefly, the cup is held on the mandrel, maintained at a temperature of 180° to 260° F., for a contact time of 4 to 8 seconds. Best results have resulted from a mandrel temperature of between about 210° F. and about 230° F. when using a 6.6 second contact time.

An apparatus is also disclosed for treating generally closed cell foam cups to improve the sidewall deflection strengths of the cup comprising a rotatable turret, means to drive said turret, and plurality of mandrels mounted on said turret, means to heat said mandrels, means to apply vacuum and gas under pressure to each of said mandrels at preselected positions on said turret, means to feed cups to a mandrel in a first position, and means to convey cups from a mandrel in a second position.

In the preferred apparatus, the mandrels are electrically heated and contain means for temperature control. Any suitable power source can be used.

In an embodiment of the method of this invention, the cups are fed to the mandrel and maintained thereon by vacuum applied to the bottom of the cup by the mandrel and removed by forcing a gas under pressure between the mandrel and the cup. This gas may be heated and preferably is air.

The sidewall prior to heating has a thickness of 0.02 to 0.05 inch and heating provides an increase in thickness of 10 to 50 percent. Generally, the foam layer of a laminate of foam and a solid resin layer has a given "extruded thickness" measured immediately after the foam leaves the extrusion mandrel. This "extruded thickness" is decreased as the foam is subjected to mechanical stresses imparted by the haul off, winder and/or extrusion coating operation which crush the foam to a lesser thickness. The post treatment process restores the "extruded thickness" of the foam for optimum sidewall rigidity or deflection strength.

An additional result obtained through the use of our invention is the improved internal surface characteristics of the cup. When formed on the cup making machine, wrinkles are produced on the inside surface of the cup which detract from the aesthetics of the cup and these wrinkles are removed in the heat treatment of this invention.

Figure 1:
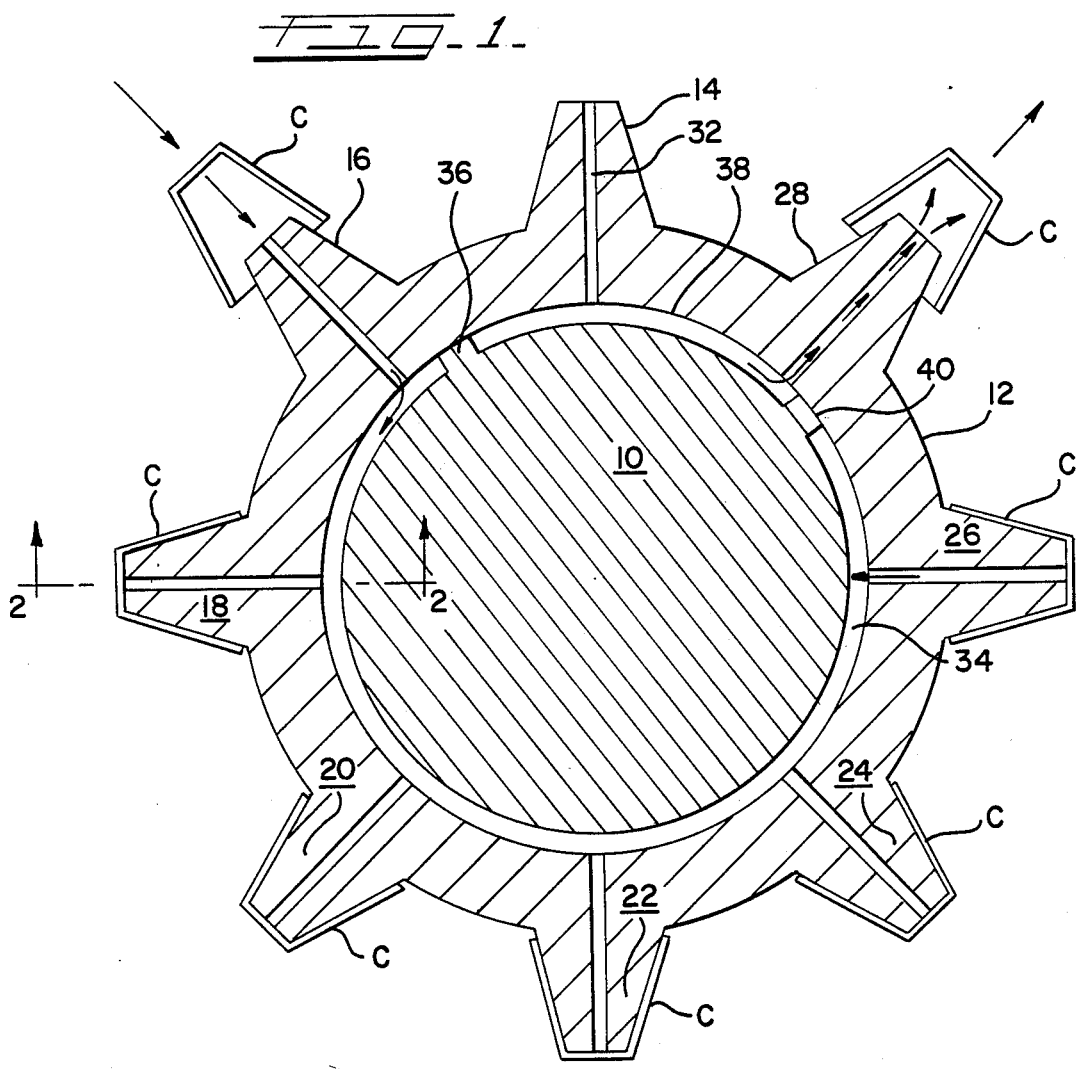
FIG. 1 is a cross-section of the apparatus of this invention for treating cups.

While various types of apparatus can be used in the practice of our invention, one suitable system is shown in FIG. 1 as described below.

Turret 12 rotates around an arm 10. Turret 12 is provided with a plurality of mandrels 14, 16, 18, 20, 22, 24, 26, and 28. The cups C fit upon each mandrel with contact over substantially all of the bottom of the cup and leaving a space 30 (see FIG. 2) between the outside diameter of the heated mandrel and the inside diameter of the cup. Each mandrel is provided with a central bore 32 in FIG. 1 and in the cross-section of FIG. 2. Between arm 10 and the inner surface of turret 12 there is provided an open space 34 which connects with the bore 32 in each mandrel. Stationary blocks 36, 38, and 40 serve to separate the space 34 into 3 distinct chambers. By means not shown, a vacuum is applied to space 34 between barriers 36 and 40 extending for most of the circumference of arm 10. Gas under pressure is provided in the space between barriers 38 and 40. A chute (not shown) guides cups C onto mandrel 16 in a first position and guide means (not shown) are positioned above mandrel 28 to guide cups removed from the turret. More specific details are shown in FIG. 2, this drawing also illustrating a heating coil 42 in the mandrel. The heating coil temperature is controlled in ways known to the art. For instance, one can use a control thermocouple to supply a control signal to a temperature controller or by the use of a properly calibrated variable voltage transformer. FIG. 2 also shows the stationary arm 10 and rotating turret 12. To maintain vacuum or pressure in the space 34, Teflon plastic rings 44 and 46 are provided.

In the operation, cups are supplied to mandrel 16 in a first position and held thereon by the vacuum until the turret reaches the position shown for turret 28. At this stage, the gas under pressure blows the cup off of the mandrel. Heated gas can be used if further heat treatment is desired. For reasons of economy, air is the preferred gas.

Turrets with different sized mandrels can be used for the various cups produced, 6 through 44 ounce being the normal range of size.

To assist in positioning the foam cup sidewall equidistant from the heated mandrel, a number of raised projections 52 are located on the mandrel. The number of projections which are hemispherical in shape should be at least four with two located on the mandrel at a position corresponding to the bottom of the foam cup when the foam cup is in the normal position on the mandrel and two projections located on the heated mandrel corresponding to a position near the top of the cup.

To improve cup release from the mandrel and to increase resistance to abrasion of the mandrel surface, the mandrel can be coated with a Teflon/ceramic coating 47. The speed of the treatment and the number of mandrels depend upon the time for the desired time of contact. The range of 4 to 8 seconds is most generally used.

The test to determine the sidewall deflection strength of the foam cups used the following procedure. Each cup was placed on a platform to which sidewall pressure was applied at a distance below the rim of the cup equal to one/third the height of the cup. A gram scale was provided to apply a gradually increased mass to the area of the cup indicated above and the deflection measured. A cup which exhibited a sidewall deflection strength of 300 grams or greater at a deflection of ⅜ of an inch was deemed acceptable.

The following example sets forth preferred embodiments of the invention, but the example should not be considered unduly limiting.

EXAMPLE 1

Amoco R2 grade of polystyrene resin from Amoco Chemical Company was extruded by the blown bubble technique using a mixture of isopentane and n-butane in the weight ratio of 68/32 in an amount of 3.0 wt. percent as a blowing agent and a talc in an amount of 1.8 wt. percent as a nucleating agent, all weights being based upon the amount of polystyrene resin present. The production system is well-known. After slitting and opening of the sheet to a flat structure, the sheet was fed between nip rollers into which nip was extruded a polystyrene solid resin. The solid resin was a 50/50 mixture of Amoco R2 and Amoco H2R polystyrene, the mixture containing, as a pigment, 2 to 4 wt. percent of $TiO_2$. A good bond was obtained with this system. The resultant foam thickness was slightly less than 0.03 inch and the solid resin thickness was approximately 0.002 inch.

The resulting foam roll stock was then used in the method of this invention to produce cups. The sidewall deflection strength was determined for an 8.3 ounce cup using a 6.6 second time as the dwell time for the cup on the heated mandrel for various temperatures. The thickness of the sidewall before post treatment was 0.030–0.032 inch. The average sidewall deflection force is the force in grams required to produce a deflection of ⅜ inch in the sidewall of the cup when the force is applied to the cup at a distance below the rim of the cup equal to ⅓ of the height of the cup. The sidewall thickness and sidewall deflection strength were determined as a function of mandrel temperature and are presented in the table below.

TABLE 1

| Mandrel Temperature °F. | Average Sidewall Thickness Inch | Average Sidewall Deflection Force Grams |
| --- | --- | --- |
| 170 | 0.034 | 270[1] |
| 190 | 0.038 | 296 |
| 210 | 0.040 | 330 |
| 230 | 0.042 | 342 |
| 250[2] | NA | NA |

[1]-Insufficient post treating-cups had objectionable wrinkles on the inside surface of sidewall.
[2]At 250° F. mandrel temperature and a 6.6 second dwell time the cups stuck to the mandrel and would not eject.
NA—not available From the foregoing description, those skilled in that art will appreciate that the modification can be made without departing from the broad scope of the invention. It is not intended to limit the broad scope of the invention to those embodiments illustrated and described, but reasonable modifications can be made.

We claim:

1. A method of providing a foam cup having a sidewall and a bottom, said cup having an improved sidewall deflection strength and being suitable for use with hot beverages, comprising:

(a) forming the foam cup from a roll stock of a polystyrene foam by rolling said roll stock into shape to form the sidewall, subsequently forming the bottom of the cup from said roll stock and sealing the bottom to the sidewall of the foam cup, (b) placing said cup around a heated mandrel, said mandrel having an outside diameter sufficiently less than than the inside diameter of the cup so that the sidewall of the cup is not in contact with the mandrel, and (c) maintaining the cup around said mandrel at a temperature and for a time sufficient to expand the sidewall of the cup to increase the sidewall deflection strength of the cup.

2. The method of claim 1 wherein said roll stock is produced from a laminate of a polystyrene foam, said polystyrene foam formed from a polystyrene resin and a volatile blowing agent and, on at least one surface of the foam, a layer of a solid polystyrene.

3. The method of claim 2 wherein the volatile blowing agent is a mixture of n-butane and isopentane.

4. The method of claim 2 wherein the volatile blowing agent is a mixture of n-butane and n-pentane.

5. The method of claim 3 wherein the mixture of n-butane and isopentane has a weight ratio of between 95/5 to 5/95.

6. The method of claim 4 wherein the mixture of n-butane and n-pentane has a weight ratio of between 95/5 to 5/95.

7. The method of claim 1 wherein the temperature of the mandrel is maintained at about 180° to 260° F. and said time of contact is about 4 to 8 seconds.

8. The method of claim 1 wherein the temperature of the mandrel is maintained between about 210° F. and about 230° F. and said time of contact is 6.6 seconds.

9. The method of claim 1 wherein the bottom of said foam cup is maintained against said mandrel by vacuum and said foam cup is ejected from said mandrel by gas under pressure.

10. The method of claim 9 wherein the gas under pressure is heated.

11. The method of claim 1 wherein the heated mandrel has a number of raised projections located on said mandrel.

12. The method of claim 11 wherein the number of projections is at least four.

13. The method of claim 1 wherein the sidewall deflection strength, as measured by a force required to deflect the sidewall of the cup to a depth of ⅜ inch when the force is applied to the sidewall of the cup at a distance below the rim of the cup equal to ⅓ the height of the cup, is 300 grams or greater.

* * * * *